United States Patent
Numbers

(10) Patent No.: US 10,442,538 B2
(45) Date of Patent: Oct. 15, 2019

(54) ADJUSTABLE FORCED AIR AIRCRAFT DE-ICING SYSTEM

(71) Applicant: Lee Williams, Orlando, FL (US)

(72) Inventor: Keith Numbers, Dayton, OH (US)

(73) Assignee: Lee Williams, Orlando, FL (US)

( * ) Notice: Subject to any disclaimer, the term of this patent is extended or adjusted under 35 U.S.C. 154(b) by 222 days.

(21) Appl. No.: 15/179,247

(22) Filed: Jun. 10, 2016

(65) Prior Publication Data

US 2016/0362185 A1 Dec. 15, 2016

Related U.S. Application Data

(60) Provisional application No. 62/174,139, filed on Jun. 11, 2015.

(51) Int. Cl.
| | |
|---|---|
| *B64D 15/10* | (2006.01) |
| *B05B 7/24* | (2006.01) |
| *B64F 5/23* | (2017.01) |

(52) U.S. Cl.
CPC ............ *B64D 15/10* (2013.01); *B05B 7/2494* (2013.01); *B64F 5/23* (2017.01)

(58) Field of Classification Search
CPC ......... B64D 15/10; B64F 5/23; B05B 7/2494; B05B 1/34; B05B 13/005
USPC ................. 239/420, 436–438, 451, 453, 456; 169/89
See application file for complete search history.

(56) References Cited

U.S. PATENT DOCUMENTS

| | | | | |
|---|---|---|---|---|
| 2,307,014 A | * | 1/1943 | Becker | ...................... B05B 1/12 |
| | | | | 239/438 |
| 4,252,278 A | * | 2/1981 | McMillan | ............. B05B 1/3073 |
| | | | | 239/459 |
| 5,104,068 A | | 4/1992 | Krilla et al. | |
| 5,244,168 A | * | 9/1993 | Williams | .................. B64F 5/20 |
| | | | | 244/134 C |
| 5,755,404 A | | 5/1998 | Numbers | |
| 6,250,588 B1 | | 6/2001 | Numbers | |
| 6,360,992 B1 | * | 3/2002 | Stanko | ...................... B64F 5/23 |
| | | | | 239/290 |
| 7,828,231 B2 | | 11/2010 | Harms | |
| 2009/0104343 A1 | * | 4/2009 | Espenschied | ......... B05B 12/085 |
| | | | | 427/9 |
| 2012/0160939 A1 | | 6/2012 | Svanebjerg | |

* cited by examiner

*Primary Examiner* — Alexander M Valvis
*Assistant Examiner* — Qingzhang Zhou
(74) *Attorney, Agent, or Firm* — The Webb Law Firm

(57) ABSTRACT

An aircraft de-icing system has a nozzle with at least one movable element configured to move between a first position and a second position to change a spraying configuration of the nozzle between a first configuration and a second configuration. The aircraft de-icing system further has at least one storage reservoir configured for containing a de-icing agent and a pump for pumping the de-icing agent from the at least one storage reservoir to the nozzle. The aircraft de-icing system further has a pressurized air source in fluid communication with the nozzle for delivering pressurized air to the nozzle. The nozzle is configured for selectively mixing varying amounts of the pressurized air and varying amounts of the de-icing agent to provide a spray pattern for application on a surface of an aircraft based on a position of the at least one movable element between the first position and the second position.

19 Claims, 5 Drawing Sheets

ADJUSTABLE FORCED AIR AIRCRAFT DE-ICING SYSTEM

CROSS-REFERENCE TO RELATED APPLICATIONS

Figure 1:
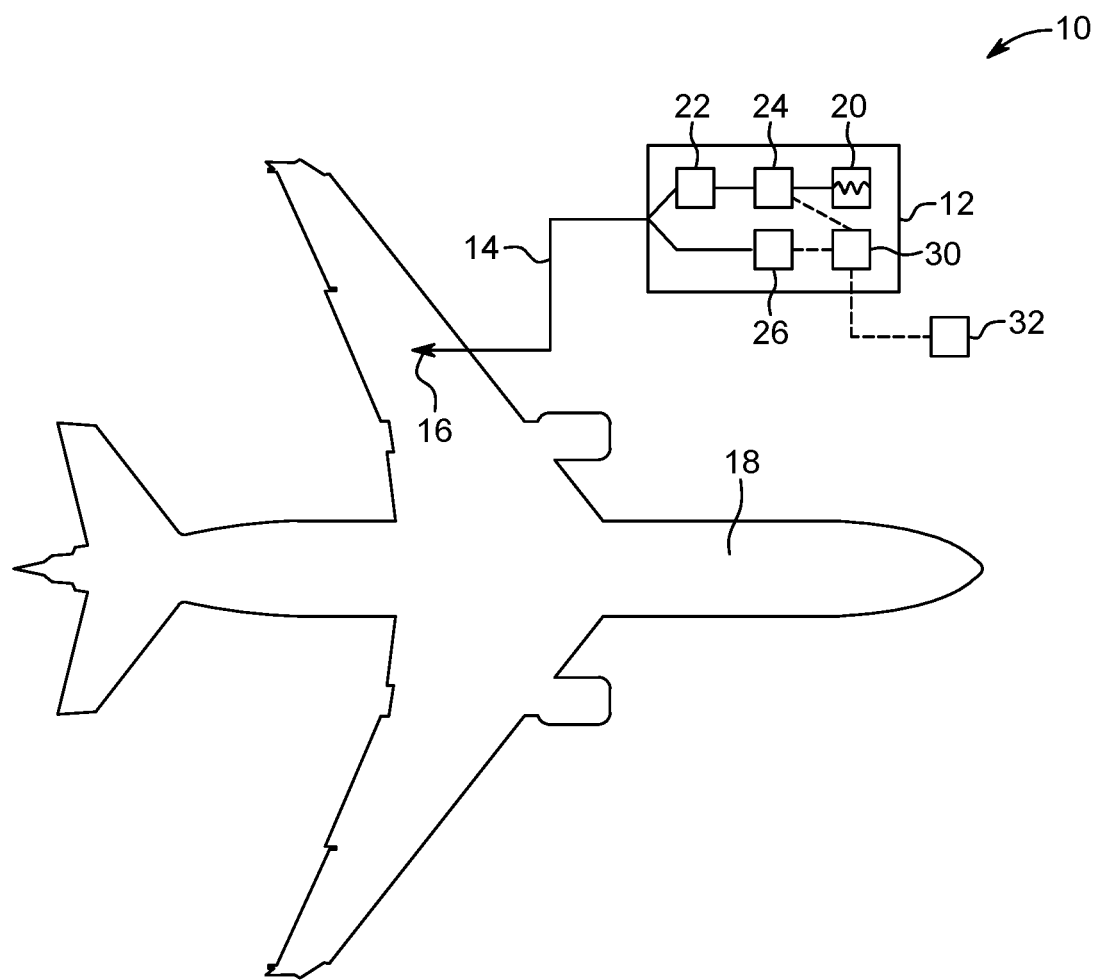

This application claims priority to Provisional U.S. Application No. 62/174,139, filed on Jun. 11, 2015 and titled "Adjustable Forced Air Aircraft Deicing System", the disclosure of which is incorporated herein by reference in its entirety.

BACKGROUND OF THE INVENTION

Field of the Invention

The present invention relates generally to systems and methods for de-icing aircraft, and more particularly to a system and method for the forced air de-icing of aircraft with an adjustable forced de-icing system.

Description of the Related Art

De-icing of aircraft involves removing snow, ice, and/or frost from various surfaces of the aircraft. De-icing is traditionally performed by spraying dry or liquid chemicals on the aircraft. In some examples, a heated mixture of a de-icing agent, such as antifreeze (or glycol), and water is sprayed by pressurized air through a nozzle provided on a movable boom secured on a stationary or mobile platform. Examples of known de-icing systems and methods are described in U.S. Pat. Nos. 5,244,168, 5,755,404, and 6,250,588. These de-icing systems and methods use a fixed nozzle in fluid communication with a fixed supply of the de-icing agent and pressurized air. The de-icing agent and pressurized air are mixed in the nozzle and delivered from the nozzle as a jet of pressurized de-icing agent.

Conventional de-icing systems are configured for fixed nozzle operation. In other words, the nozzle has a fixed aperture (i.e., not adjustable) and the jet velocity is determined by air source or compressor/blower speed that delivers pressurized air at a fixed flow rate. The optimal jet velocity is attained when a compressor/blower used to deliver the air delivers a pressure ratio of about two, resulting in a jet velocity of about 1,000 ft/sec at the nozzle exit. Effectiveness of conventional forced air de-icing systems is primarily dependent on the velocity of the jet downstream of the nozzle exit. The higher the jet velocity, the more pressure and force is imparted to the aircraft surface to remove ice and snow. The jet velocity typically decays rapidly as the forced air stream mixes with the surrounding air. Some de-icing systems have the capability to reduce the power to the compressor/blower and hence nozzle exit velocity; however, such operation is still based on using a fixed nozzle with a diminished jet velocity at increased distance.

While conventional de-icing systems and methods are effective in removing snow, ice, and/or frost, they are associated with a number of disadvantages. Weather conditions during de-icing operations often change continuously such that a jet delivered from a fixed nozzle rarely performs in an optimum manner to maximize the de-icing efficiency while minimizing use of the de-icing agent. Also, overblow of snow from the aircraft reduces visibility around the aircraft, thereby creating a hazard for ground workers. Conventional de-icing systems require the operator to get close to the aircraft (typically five to ten feet) to maintain an effective snow and ice removal capability of the fixed nozzle which rapidly diminishes if the distance between the nozzle and the aircraft is increased. In addition, noise generated by conventional fixed nozzles is often close to or exceeds the permissible noise limit that is enforced at various airports.

It would be desirable to develop new systems and methods for de-icing aircraft that overcome the deficiencies associated with conventional de-icing systems and methods.

SUMMARY OF THE INVENTION

In view of the disadvantages of prior art de-icing systems, it is desirable to provide an improved de-icing system having an adjustable forced air nozzle. It would be further desirable to provide an improved de-icing system having an adjustable forced air nozzle that remains effective in all weather conditions and/or at various distances of the nozzle from the, aircraft. It would be further desirable to provide an improved de-icing system configured to reduce consumption of the de-icing agent and reduce overall noise emitted by the nozzle. It would be further desirable to provide a system having an adjustable forced air nozzle that is configured for washing a surface of an aircraft using, for example, a cleaning solution.

In some examples, an aircraft de-icing system may include a nozzle with at least one movable element configured to move between a first position and a second position to change a spraying configuration of the nozzle between a first configuration and a second configuration. The aircraft de-icing system further may have at least one storage reservoir configured for containing a de-icing agent and a pump for pumping the de-icing agent from the at least one storage reservoir to the nozzle. The aircraft de-icing system further may have a pressurized air source in fluid communication with the nozzle for delivering pressurized air to the nozzle. The nozzle may be configured for selectively mixing varying amounts of the pressurized air and varying amounts of the de-icing agent to provide a spray pattern for application on a surface of an aircraft based on a position of the at least one movable element between the first position and the second position.

In some examples, the nozzle may have a nozzle body having a proximal end, a distal end, and a sidewall extending between the proximal end and the distal end along a longitudinal axis. The nozzle may also have a plug within at least a portion of the nozzle body at the distal end of the nozzle body, and a cowl surrounding at least one of the nozzle body and the plug. The cowl may be movable relative to the nozzle body in a direction along the longitudinal axis. The cowl may have a first portion having an inner diameter that is larger than an outer diameter of the nozzle body, and a second portion extending distally from the first portion. The second portion may have a conical shape that gradually narrows in diameter in a direction from the proximal end to the distal end of the nozzle body and terminates in an open end. An inner surface of the second portion of the cowl and an outer surface of the distal end of the plug may define an annular space such that movement of the cowl relative to the nozzle body changes a cross-sectional area of the annular space. The cross-sectional area of the annular space may increase as the cowl is moved in a direction from the proximal end of the nozzle body toward the distal end of the nozzle body, and the cross-sectional area of the annular space may decrease as the cowl is moved in a direction from the distal end of the nozzle body toward the proximal end of the nozzle body. A drive mechanism may be provided for moving the cowl relative to the nozzle body. A seal may be provided between an inner surface of the cowl and an outer surface of the nozzle body.

In some examples, the plug may have a rounded proximal end and a conical distal end that gradually reduces in cross-sectional area in a direction from the proximal end toward the distal end. The plug may be attached to an inner surface of the sidewall of the nozzle body by one or more struts that extend in a radially outward direction from an outer surface of the plug to an inner surface of the sidewall of the nozzle body. At least a portion of the plug may extend distally from a terminal end of the nozzle body. The plug may have a first portion fixed relative to the nozzle body and the cowl, and a second portion movable relative to the first portion from a first position to a second position in a direction along the longitudinal axis. A drive mechanism may be provided for moving the second portion of the plug relative to the first portion of the plug. A seal may be provided between the first portion of the plug and the second portion of the plug. A controller may be configured for controlling a delivery of the de-icing agent and pressurized air to the nozzle. The controller may be configured to recall a pre-programmed spray protocol, and adjust the nozzle and the delivery of the pressurized air and the de-icing agent to the nozzle based on the pre-programmed spray protocol.

In some examples, a nozzle for an aircraft de-icing system may include a nozzle body having a proximal end, a distal end, and a sidewall extending between the proximal end and the distal end along a longitudinal axis, and a cowl surrounding the nozzle body and movable relative to the nozzle body in a direction along the longitudinal axis. The cowl may have a first portion having an inner diameter that is larger than an outer diameter of the nozzle body, and a second portion extending distally from the first portion. An inner surface of the first portion of the cowl and an outer surface of the distal end of the nozzle body may define an annular space. A cross-sectional area of the annular space may increase as the cowl is moved in a direction from the proximal end of the nozzle body toward the distal end of the nozzle body, and the cross-sectional area of the annular space may decrease as the cowl is moved in a direction from the distal end of the nozzle body toward the proximal end of the nozzle body. The nozzle may be configured for selectively mixing varying amounts of pressurized air and a de-icing agent to provide a spray pattern for application on a surface of an aircraft based on a position of the cowl relative to the nozzle body. A drive mechanism may be provided for moving the cowl relative to the nozzle body.

In some examples, a nozzle for an aircraft de-icing system may have a nozzle body having a proximal end, a distal end, and a sidewall extending between the proximal end and the distal end along a longitudinal axis, and a plug within at least a portion of the nozzle body at the distal end of the nozzle body. The plug may have a first portion fixed relative to the nozzle body, and a second portion movable relative to the first portion from a first position to a second position in a direction along the longitudinal axis. The nozzle may have a cowl surrounding at least one of the nozzle body and the plug. An inner surface of the second portion of the cowl and an outer surface of the distal end of the plug define an annular space. A cross-sectional area of the annular space may increase as the cowl is moved in a direction from the proximal end of the nozzle body toward the distal end of the nozzle body, and the cross-sectional area of the annular space may decrease as the cowl is moved in a direction from the distal end of the nozzle body toward the proximal end of the nozzle body. The nozzle may be configured for selectively mixing varying amounts of pressurized air and a de-icing agent to provide a spray pattern for application on a surface of an aircraft based on a position of the first portion of the plug relative to the second portion of the plug. A seal may be provided between an inner surface of the cowl and an outer surface of the nozzle body.

In some examples, the nozzle may be infinitesimally adjustable between the high pressure, low volume mode and the low pressure, high volume mode. The nozzle may have a plurality of finite adjustments between the high pressure, low volume mode and the low pressure, high volume mode. A heater may be provided for heating the de-icing agent before the de-icing agent is delivered to the nozzle. The pressurized air source may be an air compressor. The pressurized air source may have an air heater. A movable boom may be provided, and the nozzle may be mounted to the movable boom such that the nozzle is movable with a movement of the boom.

These and other features and characteristics of the aircraft de-icing system and various nozzles for use with the aircraft de-icing system described herein, as well as the methods of manufacture of such articles, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only. As used in the specification and the claims, the singular form of "a", "an", and "the" include plural referents unless the context clearly dictates otherwise.

BRIEF DESCRIPTION OF THE DRAWINGS

FIG. 1 is a representative schematic view of an ADS in accordance with a one preferred and non-limiting example of the present invention;

FIG. 2A is a representative cross-sectional side view of a nozzle for use with an ADS in accordance with one example shown in a first configuration;

FIG. 2B is a representative cross-sectional side view of the nozzle of FIG. 2A shown in a second configuration;

FIG. 3A is a representative cross-sectional side view of a nozzle for use with an ADS in accordance with another example shown in a first configuration;

FIG. 3B is a representative cross-sectional side view of the nozzle of FIG. 3A shown in a second configuration;

FIG. 4A is a representative cross-sectional side view of a nozzle for use with an ADS in accordance with another example shown in a first configuration;

FIG. 4B is a representative cross-sectional side view of the nozzle of FIG. 4A shown in a second configuration; and FIG. 5 is a representative graph illustrating a change in velocity of a fluid jet exiting a nozzle as a function of distance away from the nozzle.

In FIGS. 1-5 the same characters represent the same components unless otherwise indicated.

DETAILED DESCRIPTION

As used herein, spatial or directional terms, such as "left", "right", "up", "down", "inner", "outer", "above", "below", and the like, relate to various features as depicted in the drawing figures. However, it is to be understood that various alternative orientations can be assumed and, accordingly, such terms are not to be considered as limiting.

As used herein, the term "substantially parallel" means a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values. As used herein, the term "substantially perpendicular" means a relative angle of intersection between two objects that is 90°+/−5°, or from 90°+/−3°, or from 90°+/−2°, or from 90°+/−1°, or from 90°+/−0.5°, or from 90°+/−0.25°, or from 90°+/−0.1°, inclusive of the recited values.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Unless otherwise indicated, all numbers expressing quantities used in the specification and/or claims are to be understood as modified in all instances by the term "about."

As used herein, the phrase "de-icing agent" means a fluid that is used for de-icing (i.e., removal of snow, ice, frost, etc.) an aircraft or anti-icing (preventing formation of snow, ice, frost, etc.) on an aircraft.

All documents, such as but not limited to issued patents and patent applications, referred to herein, and unless otherwise indicated, are to be considered to be "incorporated by reference" in their entirety.

Referring to the drawings in which like reference characters refer to like parts throughout the several views thereof, the present disclosure is generally directed to an aircraft de-icing system 10 (hereinafter "ADS") configured for removing snow, ice, and/or frost from various surfaces of an aircraft, as described herein. Various examples discussed herein are directed to one or more nozzles configured for use with the ADS 10. In various examples, such nozzles are in fluid communication with a source of pressurized air and a source of de-icing agent. Furthermore, the present disclosure provides various nozzles for adjusting a jet of pressurized air and de-icing agent mixture exiting the nozzle.

With initial reference to FIG. 1, the ADS 10 includes a base 12 having a boom 14 with a nozzle 16 mounted at a terminal end thereof. In some examples, the base 12 may be a movable base, such as a truck, that may be moved around an aircraft 18 to position the boom 14, along with the nozzle 16, at a desired position such that pressurized de-icing agent may be sprayed onto the aircraft 18 through the nozzle 16. The boom 14 may be fixed or movable to aid in positioning the nozzle 16 at a desired position relative to the aircraft 18. In other examples, the base 12 may be a stationary or fixed base with a movable boom 14. The movable boom 14 provides an advantage of positioning the nozzle 16 more closely to the aircraft 18 without fear of the possibility of collision damage to the aircraft 18. In various aspects, the nozzle 16 may be movable relative to the boom 14.

With continued reference to FIG. 1, the ADS 10 is associated with a de-icing agent storage reservoir 20 in fluid communication with the nozzle 16 for delivering the de-icing agent to the nozzle 16. In some examples, the storage reservoir 20 may be configured for storing a cleaning solution used for washing aircraft. At least one pump 22 may be provided to deliver the de-icing agent from the storage reservoir 20 to the nozzle 16. The delivery parameters, such as the flow rate of the de-icing agent, may be adjusted according to the specific snow or icing conditions on the surface of the aircraft 18. In some examples, the ADS 10 may be associated with a plurality of storage reservoirs 20 for storing different de-icing agents. Each of the plurality storage reservoirs 20 may have at least one pump 22, or a single pump 22 may be selectively placed in fluid communication with one or more of the plurality of storage reservoirs 20. In various examples, the de-icing agent may be a "Type I" fluid for de-icing (low viscosity, unthickened fluid) or a "Type IV" fluid for anti-icing (high viscosity, thickened fluid). The ADS 10 may deliver a mixture of one or more different de-icing agents to the nozzle 16. In various examples, the de-icing agent may be heated while in the storage reservoir 20 and/or while en route to the nozzle 16. A separate heater 24 may be provided for heating the de-icing agent, as determined by the operator based on the icing conditions. Desirably, the heater 24 is configured to heat the de-icing agent to a desired temperature as fast as the de-icing agent is pumped by the pump 22.

With continued reference to FIG. 1, the ADS 10 is further associated with a pressurized air source 26. The pressurized air source 26 may be a compressor configured for pressurizing ambient air to an elevated pressure, such as at a pressure ratio of about two. The pressurized air source 26 is in fluid communication with the nozzle 16 for delivering the pressurized air to the nozzle 16. The pressurized air source 26 may deliver pressurized air to the nozzle 16 at a constant or variable flow rate. Desirably, the pressurized air source 26 has an adjustable flow rate to deliver an optimum flow rate of pressurized air to the nozzle 16 depending on the de-icing conditions and a configuration of the nozzle 16.

In various examples, the ADS 10 may have a controller 30 for controlling the delivery of the de-icing agent and pressurized air to the nozzle 16. The controller 30 may control the temperature of the de-icing agent by controlling the operation of the heater 24. The controller 30 may also control the pressure and volume of the de-icing agent by controlling the operation of the pump 22. In addition, the controller 30 may control the pressure and flow rate of pressurized air by controlling the operation of the pressurized air source 26. In various examples, the controller 30 may adjust the mixture of the de-icing agent and pressurized air, such as by controlling the temperature, volume, and/or flow rate of the de-icing agent and/or pressurized air. The controller 30 may receive temperature, flow rate, and/or pressure data from one or more sensors (not shown). The controller 30 may be provided as a standalone unit, or it may be incorporated into one of the components of the ADS 10. The controller 30 may be configured or programmed to recall a pre-programmed spray protocol for a specific de-icing procedure. In some examples, the user may modify a selected pre-programmed spray protocol.

The controller 30 may be connected to a display 32 which may be positioned in a control room or cabin of the ADS 10. The display 32 is operative to present a user interface, such as a graphical user interface (GUI), for accessing information and to perform functions associated with the operation of the ADS 10. For example, the GUI interface may provide volume information of the amount of the de-icing agent in the storage reservoir 20. The GUI interface may also provide temperature and pressure information of the de-icing agent and/or pressurized air that is delivered to the nozzle 16. The GUI interface may also allow the user to control a spray pattern of the nozzle 16 and allow adjustments of the flow rate and pressure of the de-icing agent and/or pressurized air that is delivered to the nozzle 16. In one example, the display 32 may be a touch sensitive display including virtual keys and buttons for data entry, such as alphanumeric keys and symbolic keys.

Heated or unheated de-icing agent is mixed with pressurized air within the nozzle 16 to provide a desired a predetermined spray pattern of an air-entrained de-icing agent. The de-icing agent becomes entrained in the high velocity air stream within the nozzle 16 such that the entrained fluid can then be formed into a spray pattern and delivered from the tip of nozzle 16. hi some examples, heated or unheated cleaning solution is mixed with pressurized air within the nozzle 16 to provide as desired a predetermined spray pattern of air-entrained cleaning solution for washing a surface of the aircraft 18.

Having described the structure and functionality of the ADS, the structure of various examples of the nozzle 16 will now be described. In various examples, the nozzle 16 may be configured for operation in a high pressure, low volume mode and a low pressure, high volume mode. The nozzle 16 may have a number of finite adjustments between these two modes. In some examples, the nozzle 16 may be infinitesimally adjustable between these two modes, or the nozzle 16 may have a plurality of finite adjustments between the two modes. In the high pressure, low volume mode, the nozzle 16 is configured to provide the highest jet exit velocity. In use, the high pressure, low volume delivery of the de-icing mixture may be used for breaking adhesion between snow/ice and the surface of the aircraft 18. The high pressure jet is sustained in close proximity to the exit of the nozzle 16 (approximately 1 to 3 feet). On the other hand, the low pressure, high volume mode provides a reduced jet velocity at the exit of the nozzle 16 but the pressure of the jet decays less rapidly with the distance away from the exit of the nozzle 16. In this manner, the low pressure, high volume mode can be used for sweeping loose snow/ice from the surface of the aircraft 18 at greater distances. Due to the lower jet exit velocity, the low pressure, high volume mode may also be used with Type IV fluid and projected onto the surface of the aircraft 18 from greater distances.

Figure 2A:
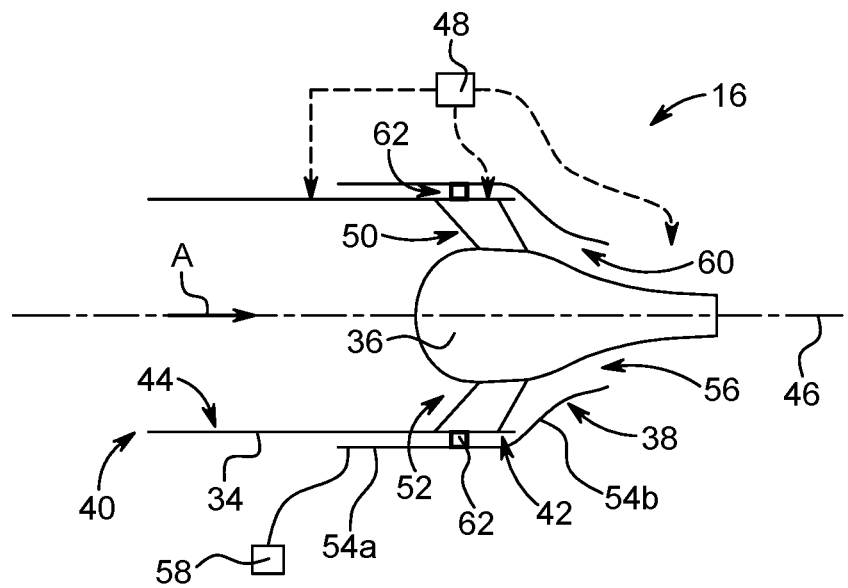
Figure 2B:
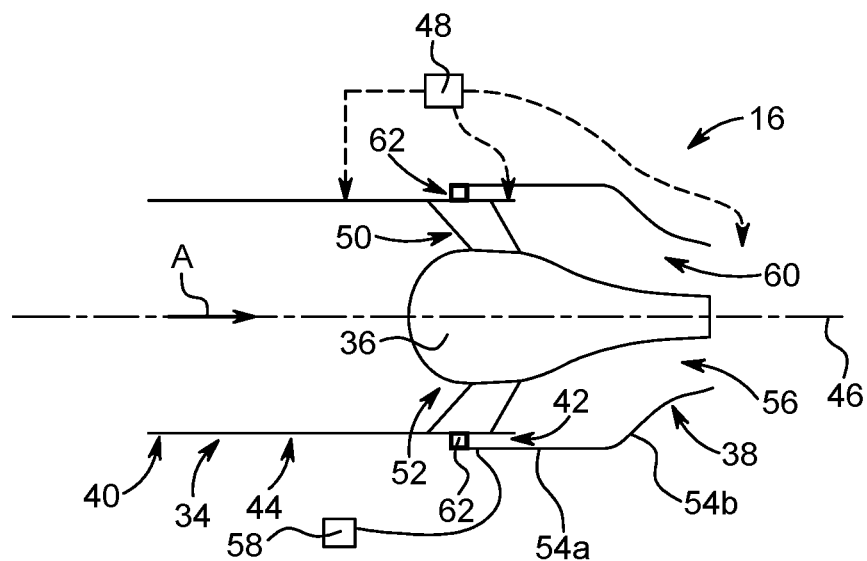

With reference to FIGS. 2A-2B, the nozzle 16 is shown in accordance with one preferred and non-limiting example of the present invention. The nozzle 16 has a nozzle body 34, a plug 36 within at least a portion of the nozzle body 34, and a cowl 38 surrounding the nozzle body 34 and/or plug 36. In some examples, the nozzle body 34 is formed as a cylindrical conduit having a proximal end 40 and a distal end 42 with a sidewall 44 extending therebetween along a longitudinal axis 46. Pressurized air from the pressurized air source 26 (shown in FIG. 1) is delivered through the nozzle body 34 in a direction from the proximal end 40 toward the distal end 42, as shown by the arrow A in FIGS. 2A-2B. A fluid inlet 48 is configured to deliver the de-icing agent to the nozzle 16 for mixing with the pressurized air. In one example, the fluid inlet 48 may be at the proximal end 40 of the nozzle body 34 and extends through the sidewall 44 of the nozzle body 34. In another example, the fluid inlet 48 may be at or near the plug 36. In yet another example, the fluid inlet 48 may be external to the nozzle body 34 at the distal end 42 of the nozzle body 34. In this example, the de-icing agent is delivered by gravity to a stream of pressurized air to become entrained with the stream, thereby forming a jet of pressurized air/de-icing fluid mixture.

With continued reference to FIGS. 2A-2B, the plug 36 may have a bulbous shape that narrows in a direction from the proximal end 40 toward the distal end 42. The plug 36 may have a rounded proximal end and a distal end that is gradually reduced in cross-sectional area in the direction from the proximal end 40 toward the distal end 42. In various examples, the plug 36 may have linear or curvilinear surfaces shaped to channel pressurized air (or a pressurized air/de-icing agent mixture) around the plug 36 through an annular opening 52 between the plug 36 and an inner surface of the sidewall 44. In some examples, the plug 36 may be attached to an inner surface of the sidewall 44 by one or more struts 50. In some examples, the one or more struts 50 extend from an outer surface of the plug 36 to an inner surface of the sidewall 44 in a radially outward direction. The plug 36, along with the struts 50, may be positioned at a distal end 42 of the nozzle 16 such that at least a portion of the plug 36 extends distally from a terminal end of the nozzle body 34. A plurality of struts 50 may be provided with even or uneven spacing or angular extension between the struts 50 in a circumferential direction. In some examples, the one or more struts 50 may be substantially perpendicular to the longitudinal axis 46, or angled at an obtuse or acute angle relative to the longitudinal axis 46 when viewed from a proximal end 40 toward the distal end 42.

With continued reference to FIGS. 2A-2B, the cowl 38 has a first portion 54a and a second portion 54b extending distally from the first portion 54a. The first portion 54a may have a substantially cylindrical shape having an inner diameter that is at least slightly larger than an outer diameter of the nozzle body 34. The second portion 54b has a substantially conical shape that gradually narrows in diameter in a direction from the proximal end 40 to the distal end 42. The second portion 54b of the cowl 38 terminates in an open end 56. In some examples, the cowl 38 is movably connected to the nozzle body 34. The cowl 38 may be movable from a first position (FIG. 2A) to a second position (FIG. 2B) in a direction along the longitudinal axis 46. In some examples, a drive mechanism 58, such as an electric motor or a mechanical linkage, is provided for moving the cowl 38 relative to the nozzle body 34 in a direction along the longitudinal axis 46. The drive mechanism 58 may be operatively connected to the controller 30 (shown in FIG. 1) for controlling the position of the cowl 38 relative to the nozzle body 34. The cowl 38 may be reciprocally movable relative to the nozzle body 34.

With reference to FIGS. 2A-2B, an annular space 60 is defined between an inner surface of the second portion 54b of the cowl 38 and an outer surface of the distal end of the plug 36. Movement of the cowl 38 relative to the nozzle body 34 controls the cross-sectional area of the annular space 60 between a first area (FIG. 2A) and a second area (FIG. 2B). In some examples, the cross-sectional area of the annular space 60 increases as the cowl 38 is moved from the proximal end 40 toward the distal end 42 relative to the nozzle body 34. In a first configuration (FIG. 2A), the nozzle 16 is configured for delivering the pressurized air (or pressurized air/de-icing agent mixture) at a high pressure and low volume. In this manner, the nozzle 16 is configured for breaking adhesion between snow/ice and the surface of the aircraft 18 (shown in FIG. 1). In a second configuration (FIG. 2B), the nozzle 16 is configured for delivering the pressurized air (or pressurized air/de-icing agent mixture) at a low pressure and high volume. In this manner, the nozzle 16 is configured for sweeping loose snow/ice from the surface of the aircraft 18 (shown in FIG. 1) at greater distances. A seal 62 may be disposed between an inner surface of the cowl 38 and an outer surface of the nozzle body 34 to seal the interface between the inner surface of the cowl 38 and the outer surface of the nozzle body 34.

Figure 3A:
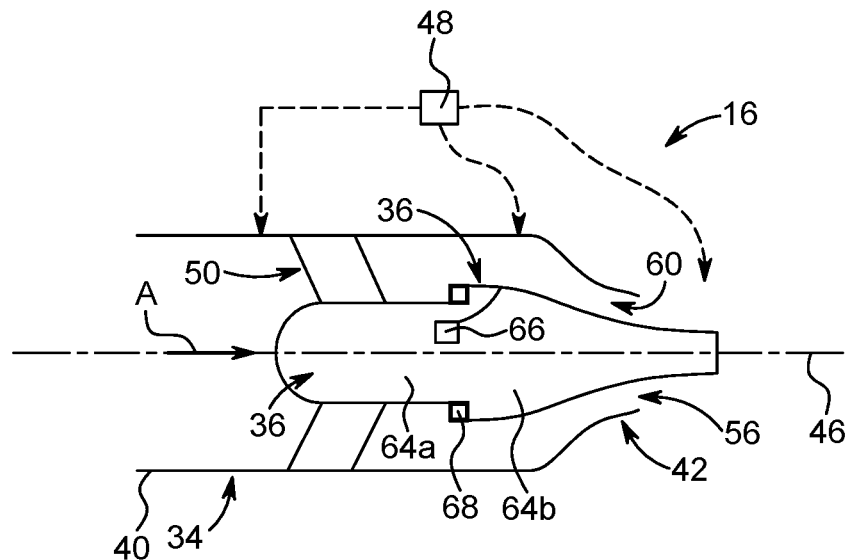
Figure 3B:
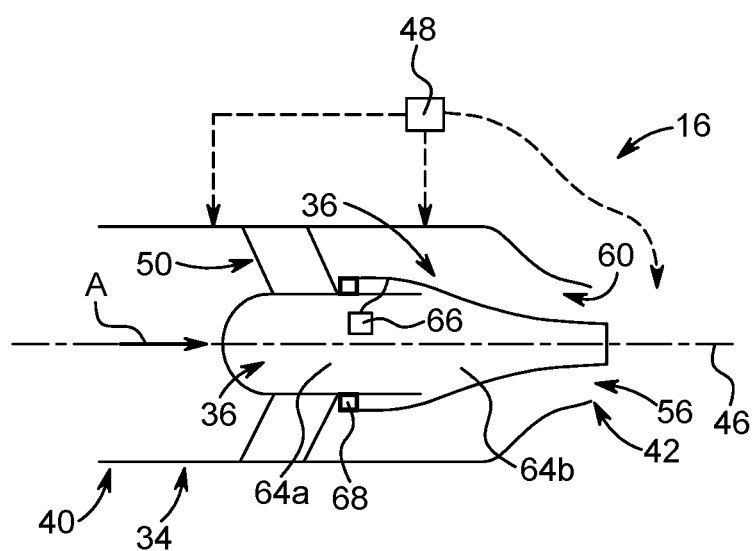

With reference to FIGS. 3A-3B, the nozzle 16 is shown in accordance with another preferred and non-limiting example of the present invention. The components of the nozzle 16 shown in FIGS. 3A-3B are substantially similar or identical to the components of the nozzle 16 described herein with reference to FIGS. 2A-2B. As the previous discussion regarding the nozzle 16, generally shown in FIGS. 2A-2B, is applicable to the example of the nozzle 16 shown in FIGS. 3A-3B, only the relative differences between the nozzles 16 are discussed hereinafter.

While the cowl 38 is movable relative to the nozzle body 34 in the nozzle 16 described herein with reference to FIGS. 2A-2B, the cowl 38 in FIGS. 3A-3B is fixed (i.e., not movable) relative to the nozzle body 34. In some examples, the cowl 38 may be removably or non-removably attached with the nozzle body 34, such that the distal end 42 of the nozzle body 34 is directly or indirectly connected with the first portion 54a of the cowl 38. The cowl 38 may be monolithically formed with the nozzle body 34. In order to control the cross-sectional area of the annular space 60, the plug 36 has a first portion 64a that is fixed relative to the nozzle body 34 and the cowl 38, and a second portion 64b that is movable relative to the first portion 64a, and therefore also movable relative to the nozzle body 34 and the cowl 38. The second portion 64b of the plug 36 may be movable relative to the first portion 64a from a first position (FIG. 3A) to a second position (FIG. 3B) in a direction along the longitudinal axis 46. In some examples, a drive mechanism 66, such as an electric motor or a mechanical linkage, is provided for moving the second portion 64b of the plug 36 relative to the first portion 64a in a direction along the longitudinal axis 46. The drive mechanism 66 may be operatively connected to the controller 30 (shown in FIG. 1) for controlling the position of the second portion 64b of the plug 36 relative to the first portion 64a. The second portion 64b of the plug 36 may be reciprocally movable relative to the first portion 64a.

With continued reference to FIGS. 3A-3B, the annular space 60 is defined between an inner surface of the cowl 38 and an outer surface of the second portion 64b of the plug 36. Movement of the second portion 64b of the plug 36 relative to the first portion 64a controls the cross-sectional area of the annular space 60 between a first area (FIG. 3A) and a second area (FIG. 3B). In some examples, the cross-sectional area of the annular space 60 increases as the second portion 64b of the plug 36 is moved from the proximal end 40 toward the distal end 42 relative to the first portion 64a. In a first configuration (FIG. 3A), the nozzle 16 is configured for delivering the pressurized air (or pressurized air/de-icing agent mixture) at a high pressure and low volume. In this manner, the nozzle 16 is configured for breaking adhesion between snow/ice and the surface of the aircraft 18 (shown in FIG. 1). In a second configuration (FIG. 3B), the nozzle 16 is configured for delivering the pressurized air (or pressurized air/de-icing agent mixture) at a low pressure and high volume. In this manner, the nozzle 16 is configured for sweeping loose snow/ice from the surface of the aircraft 18 (shown in FIG. 1) at greater distances. A seal 68 may be disposed between an inner surface of the second portion 64b of the plug 36 and an outer surface of the first portion 64a to seal the interface therebetween.

Figure 4A:
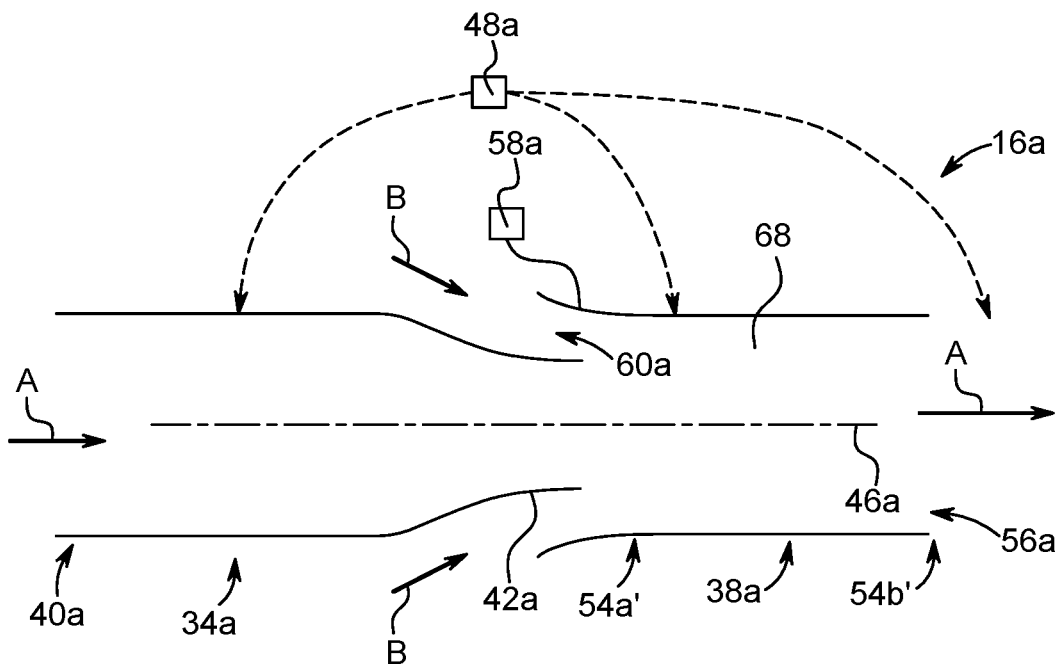
Figure 4B:
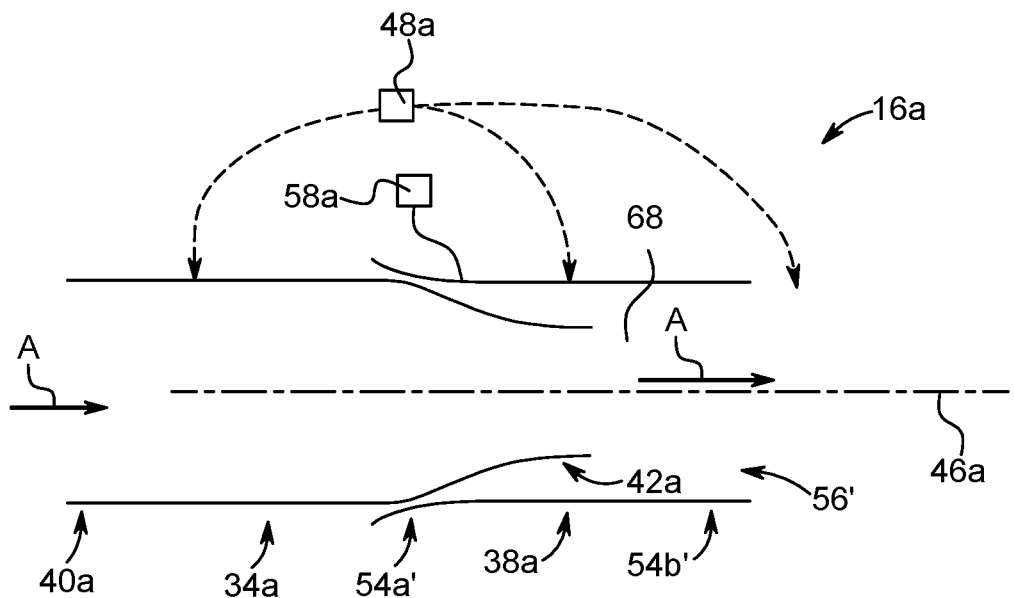

With reference to FIGS. 4A-4B, a nozzle 16a is shown in accordance with another preferred and non-limiting example of the present invention. The nozzle 16a has a nozzle body 34a, and a cowl 38a surrounding at least a portion of the nozzle body 34a. In some examples, the nozzle body 34a is formed as a cylindrical conduit having a proximal end 40a and a distal end 42a with a sidewall 44a extending therebetween along a longitudinal axis 46a. The distal end 42a of the nozzle body 34a may be conical such that it gradually tapers from the proximal end 40a toward the distal end 42a. Pressurized air from the pressurized air source 26 (shown in FIG. 1) is delivered through the nozzle body 34a in a direction from the proximal end 40a toward the distal end 42a, as shown by the arrow A in FIGS. 4A-4B. A fluid inlet 48a is configured to deliver the de-icing agent to the nozzle 16a for mixing with the pressurized air. In one example, the fluid inlet 48a may be at the proximal end 40a of the nozzle body 34a and extends through the sidewall 44a of the nozzle body 34a. In another example, the fluid inlet 48a may extend through the sidewall of the cowl 38a. In yet another example, the fluid inlet 48a may be external to the nozzle body 34a and the cowl 38a. In this example, the de-icing agent is delivered by gravity to a stream of pressurized air to become entrained with the stream, thereby forming a jet of pressurized air/de-icing fluid mixture.

With continued reference to FIGS. 4A-4B, the cowl 38a has a first portion 54a' and a second portion 54b' extending distally from the first portion 54a'. The first portion 54a' may have a substantially conical shape that gradually narrows in diameter in a direction from the proximal end 40a to the distal end 42a. The first portion 54a' may have an inner diameter that is at least slightly larger than an outer diameter of the distal end 42a nozzle body 34a. The second portion 54b' has a substantially cylindrical shape that terminates in an open end 56a. In some examples, the cowl 38a is movable relative to the nozzle body 34a. One or more struts (not shown) may be provided between the cowl 38a and the nozzle body 34a. The cowl 38a may be movable from a first position (FIG. 4A) to a second position (FIG. 4B) in a direction along the longitudinal axis 46a. In some examples, a drive mechanism 58a, such as an electric motor or a mechanical linkage, is provided for moving the cowl 38a relative to the nozzle body 34a in a direction along the longitudinal axis 46a. The drive mechanism 58a may be operatively connected to the controller 30 (shown in FIG. 1) for controlling the position of the cowl 38a relative to the nozzle body 34a. The cowl 38a may be reciprocally movable relative to the nozzle body 34a.

With continued reference to FIGS. 4A-4B, an annular space 60a is defined between an inner surface of the cowl 38a and an outer surface of the distal end 42a of the nozzle body 34a. Movement of the cowl 38a relative to the nozzle body 34a controls the cross-sectional area of the annular space 60a between a first area (FIG. 4A) and a second area (FIG. 4B) to control an amount of the de-icing agent, pressurized air, and/or a mixture of the de-icing agent and the pressurized air from being introduced through the annular space 60a in a direction of arrow B. In some examples, the cross-sectional area of the annular space 60a increases as the cowl 38a is moved away from the nozzle body 34a. The cowl 38a may be movable relative to the nozzle body 34a axially in a direction of the longitudinal axis 46a. In some examples, the cowl 38a may be rotatable radially in a direction around the longitudinal axis 46a relative to the nozzle body 34a. In this example, the size of the annular space 60a may be controlled by a rotational position of the cowl 38a relative to the nozzle body 34a. For example, rotation of the cowl 38a in a first direction (such as clockwise) about the longitudinal axis 46a may increase (or decrease) the cross-sectional area of the annular space 60a. Conversely, rotation of the cowl 38a in a second direction opposite to the first direction (such as counter-clockwise) about the longitudinal axis 46a may decrease (or increase) the cross-sectional area of the annular space 60a.

In a first configuration (FIG. 4A), the nozzle 16a is configured for delivering the pressurized air (or pressurized air/de-icing agent mixture) at a low pressure and high volume. A first stream of pressurized air (or pressurized air/de-icing agent mixture) passing through the nozzle body 34a is mixed with a second stream of ambient air (or unpressurized air/de-icing agent mixture) drawn through the annular space 60a such that the first and second streams of pressurized air (or pressurized air/de-icing agent mixture) mix in a mixing region 68 of the cowl 38a distally from the distal end 42a of the nozzle body 34a. In this manner, the nozzle 16a is configured for sweeping loose snow/ice from the surface of the aircraft 18 (shown in FIG. 1) at greater distances. In a second configuration (FIG. 4B), the nozzle 16a is configured for delivering the pressurized air (or pressurized air/de-icing agent mixture) at a high pressure and low volume. The cowl 38a may contact the nozzle body 34a such that no pressurized air (or pressurized air/de-icing agent mixture) enters through the annular space 60a. In this manner, the nozzle 16a is configured for breaking adhesion between snow/ice and the surface of the aircraft 18 (shown in FIG. 1).

In various examples, the fluid delivery to the nozzle 16 and configuration of the nozzle 16 between the high pressure, low volume mode and the low pressure, high volume mode may be synchronized so that a predetermined supply of pressurized air and/or de-icing fluid is delivered to the nozzle 16 depending on the configuration of the nozzle 16. Such synchronization of the air and/or fluid supply to the nozzle 16 contributes to the formation of a desired jet stream, such as a high pressure, low volume jet stream in the high pressure, low volume mode of the nozzle 16 operation, a low pressure, high volume jet stream in the low pressure, high volume mode of the nozzle 16 operation, or any intermediate configuration of the nozzle 16 between these two modes. In some examples, the volume of the pressurized air delivered to the nozzle 16 from the pressurized air source 26 and/or the volume of the de-icing agent delivered to the nozzle 16 by the pump 22 may be adjusted to correspond to air and/or fluid requirements of the nozzle 16 based on its operating mode. For example, if the configuration of the nozzle 16 is adjusted to the high pressure, low volume mode, the pressurized air and/or de-icing agent delivered to the nozzle 16 are adjusted accordingly by reducing the volume of air and/or fluid supplied to the nozzle 16. Such reduction in supply of air and/or fluid may be effected by reducing the supply from the pressurized air source 26 and/or the pump 22. Similarly, if the configuration of the nozzle 16 is adjusted to the low pressure, high volume mode, the pressurized air and/or de-icing agent delivered to the nozzle 16 are adjusted accordingly by increasing the volume of air and/or fluid supplied to the nozzle 16. Such increase in supply of air and/or fluid may be effected by increasing the supply from the pressurized air source 26 and/or the pump 22. Synchronized operation of the nozzle 16, pump 22, and pressurized air supply 26 may be controlled by the controller 30 to ensure the optimal air/fluid supply to the nozzle 16 based on a desired jet stream configuration. In some examples, the pressurized air and de-icing fluid delivered to the nozzle 16 and the configuration of the nozzle 16 may be adjusted manually to address special weather conditions and situations and allow for an increased number of combinations of selections.

Figure 5:
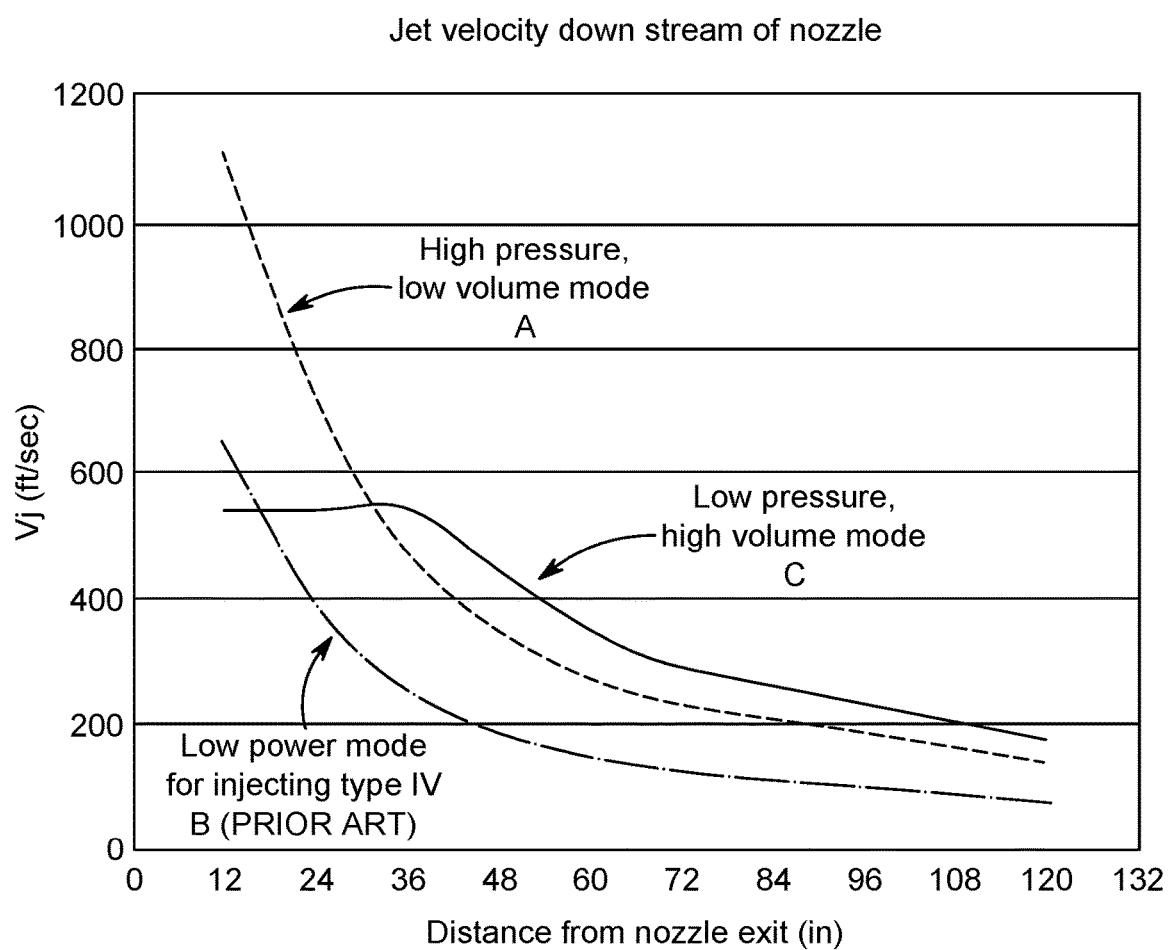

With reference to FIG. 5, this figure represents a jet velocity of a pressurized air/de-icing agent mixture downstream of the nozzle 16 as a function of distance away from the nozzle exit. Three different nozzle configurations are illustrated as Lines A, B, and C. Line A represents jet velocity when nozzle 16 is operated in a high pressure, low volume mode. The jet velocity drops significantly as the distance increases away from the nozzle exit. Line B represents a low pressure, low volume delivery typically associated with conventional nozzles when operated with Type IV fluids. The shape of Line B is roughly equivalent to the shape of Line A, although the velocity of the jet stream is substantially lower. Line C represents a jet stream velocity as a function of distance when the nozzle 16 is operated in a low pressure, high volume mode. It can be seen from the graph in FIG. 5, Line C that the jet stream velocity stays substantially constant at a distance between 12" to 26" away from the nozzle exit. At distances greater than 36", the jet stream velocity of Line C decays at a lower rate than for Lines A and B. Moreover, the jet velocity is substantially higher at distances greater that 36" than the jet velocity for Lines A and B. It can be seen that the low pressure, high volume mode sustains higher jet velocity over a longer distance from the nozzle 16 exit. The low initial velocity in Line C is advantageous for the use of Type IV fluid.

Although the disclosure has been described in detail for the purpose of illustration based on what are currently considered to be the most practical and preferred examples, it is to be understood that such detail is solely for that purpose and that the disclosure is not limited to the disclosed examples, but, on the contrary, is intended to cover modifications and equivalent arrangements. For example, it is to be understood that the present disclosure contemplates that, to the extent possible, one or more features of any example can be combined with one or more features of any other example.

What is claimed is:

1. An aircraft de-icing system comprising:
   a nozzle having at least one movable element configured to move between a first position and a second position to change a spraying configuration of the nozzle between a first configuration and a second configuration during operation of the nozzle;
   at least one storage reservoir configured for containing a liquid de-icing agent;
   a pump for pumping the de-icing agent from the at least one storage reservoir to the nozzle via a first fluid path;
   a pressurized air source in fluid communication with the nozzle for delivering pressurized air to the nozzle via a second fluid path separate from the first fluid path;
   wherein the nozzle comprises:
      a nozzle body having a proximal end, a distal end, and a sidewall extending between the proximal end and the distal end along a longitudinal axis;
      a plug within at least a portion of the nozzle body at the distal end of the nozzle body; and
      a cowl surrounding at least one of the nozzle body and the plug, and
   wherein the nozzle is configured for selectively mixing varying amounts of the pressurized air and varying amounts of the de-icing agent to provide a spray pattern for application on a surface of an aircraft based on a position of the at least one movable element.

2. The aircraft de-icing system of claim 1, wherein the cowl is movable relative to the nozzle body in a direction along the longitudinal axis.

3. The aircraft de-icing system of claim 2, wherein the cowl comprises:
   a first portion having an inner diameter that is larger than an outer diameter of the nozzle body, and
   a second portion extending distally from the first portion, the second portion having a conical shape that gradually narrows in diameter in a direction from the proximal end to the distal end of the nozzle body and terminates in an open end.

4. The aircraft de-icing system of claim 2, wherein an inner surface of the second portion of the cowl and an outer surface of the distal end of the plug define an annular space such that movement of the cowl relative to the nozzle body changes a cross-sectional area of the annular space.

5. The aircraft de-icing system of claim 4, wherein the cross-sectional area of the annular space increases as the cowl is moved in a direction from the proximal end of the nozzle body toward the distal end of the nozzle body, and wherein the cross-sectional area of the annular space decreases as the cowl is moved in a direction from the distal end of the nozzle body toward the proximal end of the nozzle body.

6. The aircraft de-icing system of claim 3, further comprising a drive mechanism for moving the cowl relative to the nozzle body.

7. The aircraft de-icing system of claim 3, further comprising a seal between an inner surface of the cowl and an outer surface of the nozzle body.

8. The aircraft de-icing system of claim 1, wherein the plug has a rounded proximal end and a conical distal end that gradually reduces in a cross-sectional area in a direction from the proximal end toward the distal end.

9. The aircraft de-icing system of claim 1, wherein the plug is attached to an inner surface of the sidewall of the nozzle body by one or more struts that extend in a radially outward direction from an outer surface of the plug to an inner surface of the sidewall of the nozzle body.

10. The aircraft de-icing system of claim 1, wherein at least a portion of the plug extends distally from a terminal end of the nozzle body.

11. The aircraft de-icing system of claim 1, wherein the plug comprises:
 a first portion fixed relative to the nozzle body and the cowl, and
 a second portion movable relative to the first portion from a first position to a second position in a direction along the longitudinal axis.

12. The aircraft de-icing system of claim 11, further comprising a drive mechanism for moving the second portion of the plug relative to the first portion of the plug.

13. The aircraft de-icing system of claim 11, further comprising a seal between the first portion of the plug and the second portion of the plug.

14. The aircraft de-icing system of claim 1, further comprising a controller configured for controlling a delivery of the de-icing agent and pressurized air to the nozzle.

15. The aircraft de-icing system of claim 14, wherein the controller is configured to recall a pre-programmed spray protocol, and adjust the nozzle and the delivery of the pressurized air and the de-icing agent to the nozzle based on the pre-programmed spray protocol.

16. A nozzle for an aircraft de-icing system, the nozzle comprising:
 a nozzle body having a proximal end, a distal end, a sidewall extending between the proximal end and the distal end along a longitudinal axis, with a first fluid path extending through the nozzle body between the proximal end and the distal end; and
 a cowl surrounding the nozzle body and movable relative to the nozzle body in a direction along the longitudinal axis during operation of the nozzle, the cowl comprising:
  a first portion having an inner diameter that is larger than an outer diameter of the nozzle body, and
  a second portion extending distally from the first portion,
 wherein an inner surface of the first portion of the cowl and an outer surface of the distal end of the nozzle body define an annular space having a second fluid path different from the first fluid path,
 wherein a cross-sectional area of the annular space increases as the cowl is moved in a direction from the proximal end of the nozzle body toward the distal end of the nozzle body, and wherein the cross-sectional area of the annular space decreases as the cowl is moved in a direction from the distal end of the nozzle body toward the proximal end of the nozzle body, and
 wherein the nozzle is configured for selectively mixing varying amounts of pressurized air and a liquid de-icing agent via the first and second fluid paths to provide a spray pattern for application on a surface of an aircraft based on a position of the cowl relative to the nozzle body.

17. The nozzle of claim 16, further comprising a drive mechanism for moving the cowl relative to the nozzle body.

18. A nozzle for an aircraft de-icing system, the nozzle comprising:
 a nozzle body having a proximal end, a distal end, and a sidewall extending between the proximal end and the distal end along a longitudinal axis, with a first fluid path extending through the nozzle body between the proximal end and the distal end;
 a plug within at least a portion of the nozzle body at the distal end of the nozzle body, the plug comprising:
  a first portion fixed relative to the nozzle body, and
  a second portion movable relative to the first portion from a first position to a second position in a direction along the longitudinal axis during operation of the nozzle; and
 a cowl surrounding at least one of the nozzle body and the plug,
 wherein an inner surface of the second portion of the cowl and an outer surface of the distal end of the plug define an annular space having a second fluid path different from the first fluid path,
 wherein a cross-sectional area of the annular space increases as the cowl is moved in a direction from the proximal end of the nozzle body toward the distal end of the nozzle body, and wherein the cross-sectional area of the annular space decreases as the cowl is moved in a direction from the distal end of the nozzle body toward the proximal end of the nozzle body; and
 wherein the nozzle is configured for selectively mixing varying amounts of pressurized air and a liquid de-icing agent via the first and second fluid paths to provide a spray pattern for application on a surface of an aircraft based on a position of the first portion of the plug relative to the second portion of the plug.

19. The nozzle of claim 18, further comprising a seal between an inner surface of the cowl and an outer surface of the nozzle body.

* * * * *